Dec. 5, 1933.  W. V. D. KELLEY  1,937,823
COLOR CINEMATOGRAPHY
Filed June 4, 1930
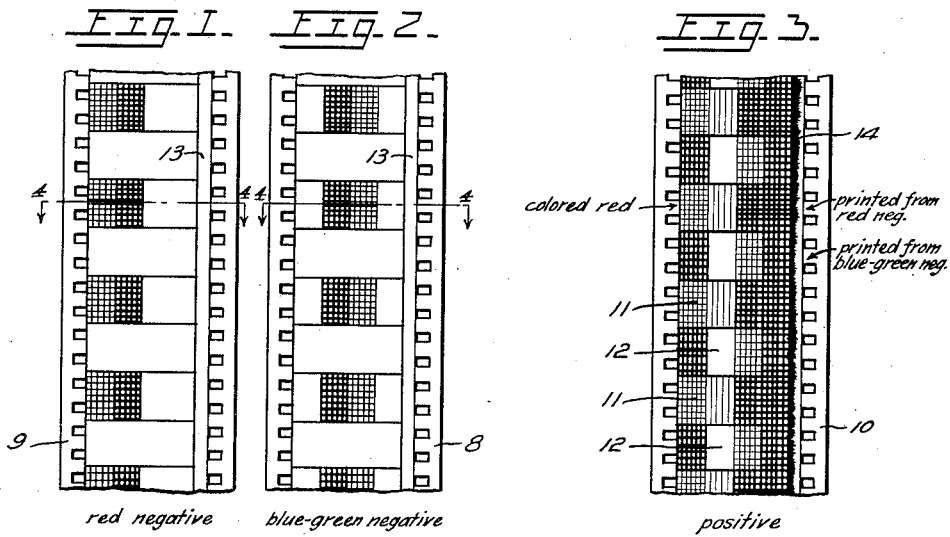
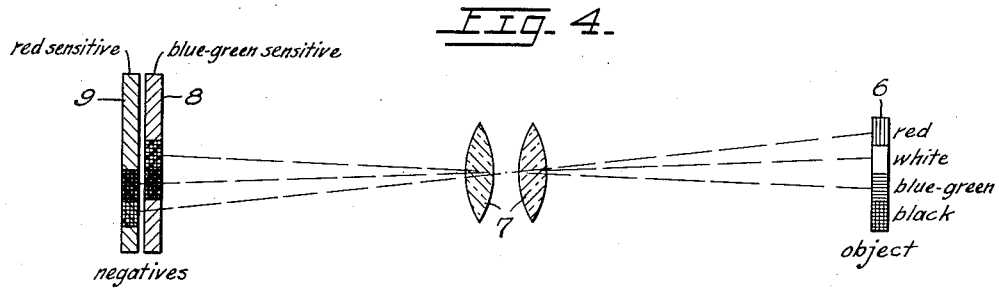
Inventor;
William V. D. Kelley,
per Arthur J. Farnsworth.
Attorney.

Patented Dec. 5, 1933

1,937,823

UNITED STATES PATENT OFFICE 1,937,823

COLOR-CINEMATOGRAPHY

William V. D. Kelley, Hollywood, Calif.

Application June 4, 1930. Serial No. 459,183

4 Claims. (Cl. 88—16.2)

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to color-cinematography, and its principal objects include; first, to provide a greatly simplified and otherwise improved process for making colored motion pictures, without sacrificing any of the advantages possible to secure with other processes now in use; second, to reduce the cost and time required for producing colored motion pictures; third, to provide a new and better arrangement for utilizing the available space on motion picture films, and thus obtain more satisfactory results upon projection; and fourth, to accomplish the foregoing objects in a process that is adapted for use with standard equipment.

My objects are attained in the manner described below, of which one method of accomplishment is illustrated diagrammatically in the accompanying drawing. In the drawing—

Figure 1 is a diagrammatic face view of an exposed negative film that is sensitive only to red, or which has been exposed only to red values;

Figure 2 is a diagrammatic face view of an exposed negative film that is sensitive only to blue-green values, and insensitive to red;

Figure 3 is a diagrammatic face view of a positive film printed from said negatives, its frames 11 being printed from the red negative 9, and its frames 12 from the blue-green negative 8; and Figure 4 is a diagrammatic and sectional plan view, on the lines 4—4 of Figs. 1 and 2, illustrating the manner in which the exposure of the negatives may be effected.

Similar reference numerals refer to similar parts throughout the several views.

In my improved system I prefer to greatly change the usual proportions of the picture frames, and to use a height that is only half of that now commonly employed. Thus the frames of my films may be said to be two sprocket-holes high, instead of four sprocket-holes, as has been customary hitherto. These frames are of much more pleasing proportions than the present nearly square frames, and the latter have resulted, not from a choice of the proportions, but from the practical necessity for providing space for a sound track.

We are accustomed to viewing scenes in nature that embrace a much wider horizontal angle than vertical angle. Thus in interiors, the width of rooms is nearly always much greater than the height. In outdoor scenes, the height of the objects above the ground is very much less than the width of the field of vision. By reducing the height of the picture frames one-half, while maintaining the same width, I secure a much more pleasing effect upon projection than results from the present use of the nearly square frames.

My invention utilizes, and is based upon, the physiological phenomena of persistence of vision, eye fatigue, and the so-called "after-image effect". The pictures are produced by color selective processes, every other frame representing the blue-green values of the object, and the intermediate frames representing the red values. By reason of the above mentioned phenomena, it is only necessary to color alternate frames of the positive film appropriately, in order to get a full color effect when the film is projected. Thus, if the alternate frames of the positive that represent the red values are colored red, the intermediate frames that represent the blue-green values may be left uncolored but will appear to be blue-green. Or the opposite may be done, coloring the frames carrying the blue-green values that color, and leaving the frames carrying the red values uncolored. In either case, upon projection, the object will appear on the screen in its full natural coloring. Obviously films can be prepared in this manner with a minimum expenditure of time and expense, and the projection thereof is correspondingly simplified. No expensive and difficult printing or color-toning is necessary, and no color wheels, containing filters or screens, have to be employed in projection. The invention accomplishes the desired result in an exceedingly simple and inexpensive manner.

In my system of color photography, since the pictures are half the usual height, there are twice as many frames in a given length of film. The speed of running the film is the same as in the ordinary practice, and the intermittent exposure mechanism is caused to move twice in the time usually required to move once. Thus the same total area of film is exposed, but there are double the usual number of individual exposures, each being but one-half the usual area. Alternate frames represent the color-values of the warm end of the spectrum, and the other frames represent the color-values of the cold end.

Although, as stated above, either set of frames of the positive may be colored its appropriate color and the others be left uncolored, I prefer to use red-orange as the tint, and to thus color the frames that represent the red-orange values. In either case the coloring will tend to reduce the amount of light passing through the colored frames, and tend to un-balance the illumination on the screen as between the colored and uncolored frames. To overcome this effect, several methods may be used. For example, the uncolored frames may be slightly "fogged", or they may have a set of either straight or cross-hatched closely spaced lines printed thereover. Still another method is to superpose a colorless tint upon the uncolored frames. In these or other known ways the "balance" of illumination may be restored, so as to avoid the effect of intermittently bombarding the screen with a surplus of light through the uncolored frames.

In the practical use of my invention, the negatives may be made by exposing alternate frames through complemental color filters. This can be done simultaneously, in well known ways, as by the use of prisms. Or use may be made of superposed sensitized emulsions of which that nearest the object is not sensitive to red, and the other is sensitive to that color. A film that is adapted for this purpose, and its method of use, is fully described in my co-pending application #353,711.

Another method of securing the results is by the use of so-called "film pack" negatives, and is illustrated in the accompanying drawing. In this method the colored object to be photographed is shown in Fig. 4 at 6. It is represented as having contiguous rectangular surfaces of red, white, blue-green, and black. Two superposed negatives, the film pack, are exposed to this object through lenses 7. Of these negatives that nearest the object, designated 8, is sensitive to blue-green values, and insensitive to red. The other negative 9, is either sensitive only to red, or it may be panchromatic if a red filter is placed between the two films. This film pack is exposed in alternate frames only, each frame being two sprocket-holes high instead of the usual four sprocket-holes high. The faces of these exposed negatives are illustrated in Figs. 1 and 2. The positive film 10 is shown in Fig. 3. Its alternate frames 11 are printed from the red negative 9, and its intermediate frames 12 are printed from blue-green negative 8. The positive when finished permissively may have only one series of its frames colored appropriately, or both series may be colored with complementary colors. In Fig. 3 the positive is shown as having its series of frames 11, that were printed from the red negative, colored red; and the intermediate series of frames 12 are left uncolored. An opposite procedure would also produce satisfactory results, that is, frames 12 could be colored blue-green, and frames 11 could be left uncolored.

Unless both series of frames of the positive are colored, it usually is desirable to slightly opaque the uncolored frames in some such manner as those herein above mentioned, in order that the light transmitted through the two series shall be substantially balanced.

Space for a sound track is represented at 13, and a sound record may be made in this space in any suitable manner, as illustrated in Fig. 3 at 14.

The positive may be made from the described negatives by using positive stock that has been coated with a suitable dye that is insoluble in the developing baths. When developed and fixed, the alternate frames of such positives represent complemental color values so far as the black and white images are concerned. The frames that carry color values corresponding to that of the dye are then coated with transparent colorless waterproof material, as described in my co-pending application #450,595; and the coloring matter is bleached out of the other portions of the film, as in the manner described in my co-pending application #353,711. This film will then have its alternate frames representing complemental color values, only one series of which is colored in the same sense as its values. Such a film will give a satisfactory representation of all the colors of the subject photographed, upon projection, by reason of the phenomena of persistence of vision, eye fatigue, and the so-called "after-image effect" mentioned above. Any objectionable unbalancing of illumination can be overcome in the way described.

The positives may also be made from uncolored stock, and alternate frames be colored later by means of a colored transparent water-proof coating; leaving the intermediate frames, and the sound track if any, clear. A still further variation of the process is to finally tint the uncolored frames a color that is complemental to the other frames. I have repeatedly noticed, however, that there appears to be no special advantage in this.

In projecting such a film, the speed of the intermittent exposure mechanism is doubled. That is to say, twice the usual number of pictures of half the height, are projected during a given interval of time. The film speed remains the same however, and the standard film speed for sound reproduction may be employed.

Where a sound record is made on a film that originally contains color, such color may be bleached out of the sound track, should it be considered desirable to do so, in the manner set forth above.

Pre-colored stock for the positives may be made by coating the film base with gelatine containing a dye, and placing a coating of light-sensitive material over the dyed gelatine. Such a film will have its sensitive material in contact with the negative in printing. Or, a photo-sensitized emulsion may be given an over-coating of gelatine containing a dye, as described in my co-pending application #353,711. In either case it is essential to use a dye that will not be affected by the developing and fixing baths.

Dyes that have the necessary characteristics include those known to the art as benzopurpurine, Congo-red, erioglaucine, and neptune green SGX. Such dyes may be bleached in solutions containing such substances as sulphite, sodium peroxide, or sodium hydrosulphite.

For the protection of the colored portions of the film, to prevent bleaching, celluloid dissolved in amyl acetate, or in other suitable solvents such as acetic ether, will afford a transparent, flexible, and waterproof coating.

Having thus fully described my invention, I claim:

1. A positive film strip adapted for color-cinematography and having alternate frames carrying red values and blue-green values respectively; one series of said frames being given a color corresponding to its color values; and the other frames being grayed to balance the light-transmitting qualities of the colored frames.

2. In color-cinematography, the process comprising; superposing a photosensitized film that is sensitive only to blue-green values, over a photosensitized film that is sensitive only to red values; exposing said superposed films to light from a colored object, in a series of spaced frames of half the normal height, the spacing being equal to the height of the frames; making developed negatives from said exposures; printing each of said negatives upon a positive film with the respective frames alternating; coloring only one series of the alternate frames of said positive film correspondingly to the color-value of the negative frames from which it was printed; and running said colored positive film at normal speed through a projecting machine operating at twice the normal aperture frequency.

3. In color-cinematography, the process comprising; making a positive cinema film of a colored object from a pair of color-selective negatives, alternate frames of the positive being made from the respective negatives; tinting the red-color value frames of the positive red-orange; graying the blue-green color value frames of the positive, whereby the light transmitting capacity of the respective series of frames will be approximately balanced; and running the thus treated positive film through a projecting machine wherein the exposure means is operated at twice the normal frequency.

4. In color-cinematography, the process comprising; making a positive cinema film of a colored object from a pair of color-selective negatives, alternate frames of the positive being made from the respective negatives; coloring the red-value frames of the positive red-orange; giving the blue-green value frames of the positive a neutral shade, whereby the light transmitting capacity of the respective series of frames will be approximately balanced; producing a sound record on said positive film, synchronizable with said alternate frames taken as pairs; running the thus treated positive film through a projecting machine wherein the exposure means is operated at twice the normal frequency; and, simultaneously with said running, reproducing sound by means of said sound record, synchronized with the corresponding alternate frames of the film taken as pairs.

WILLIAM V. D. KELLEY.